Feb. 22, 1955 G. CORNELIUS 2,702,717
WHEEL SUPPORTED PIPE LINE
Filed Sept. 5, 1950 2 Sheets-Sheet 1
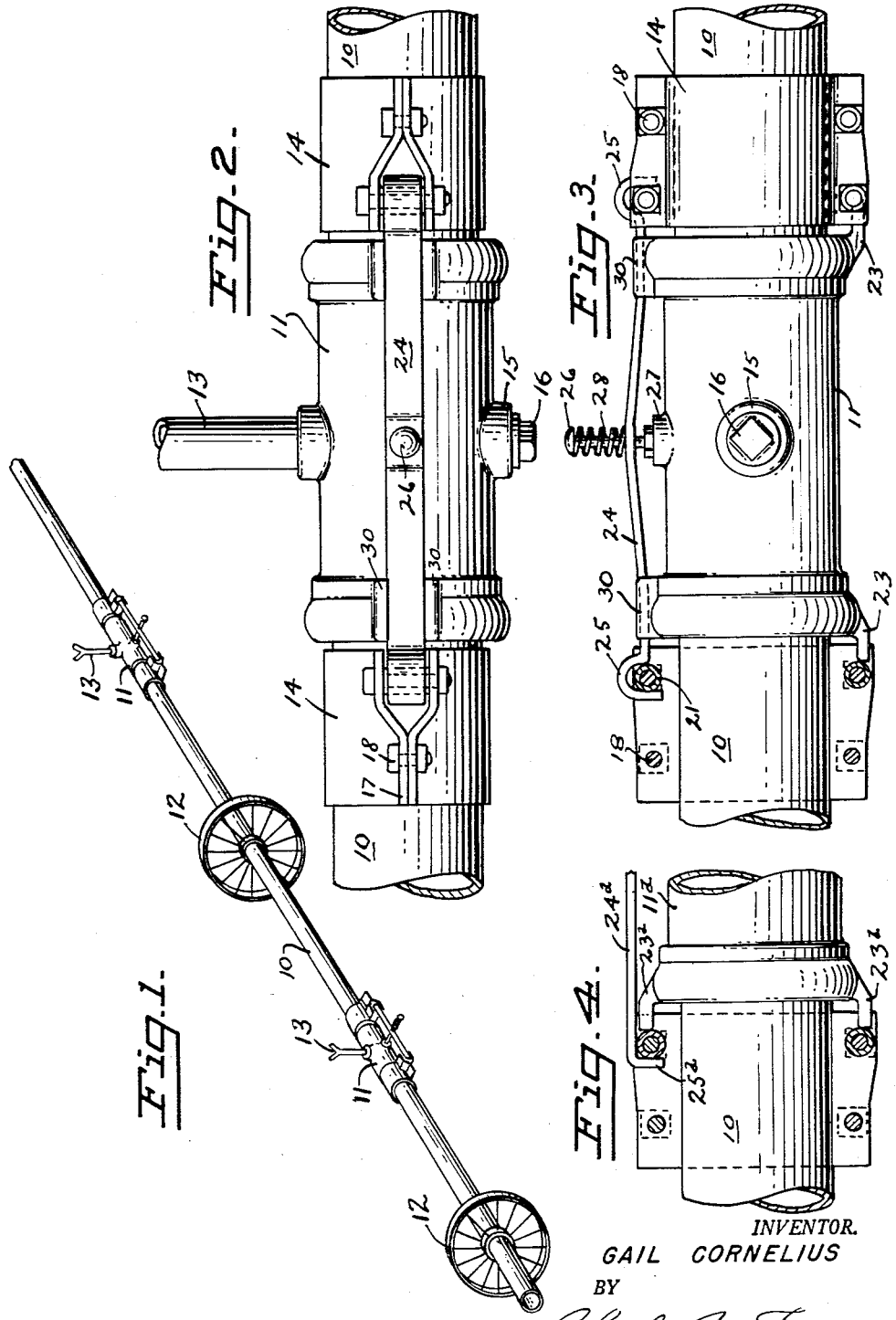
INVENTOR.
GAIL CORNELIUS
BY
Charles M. Fryer
ATTORNEY

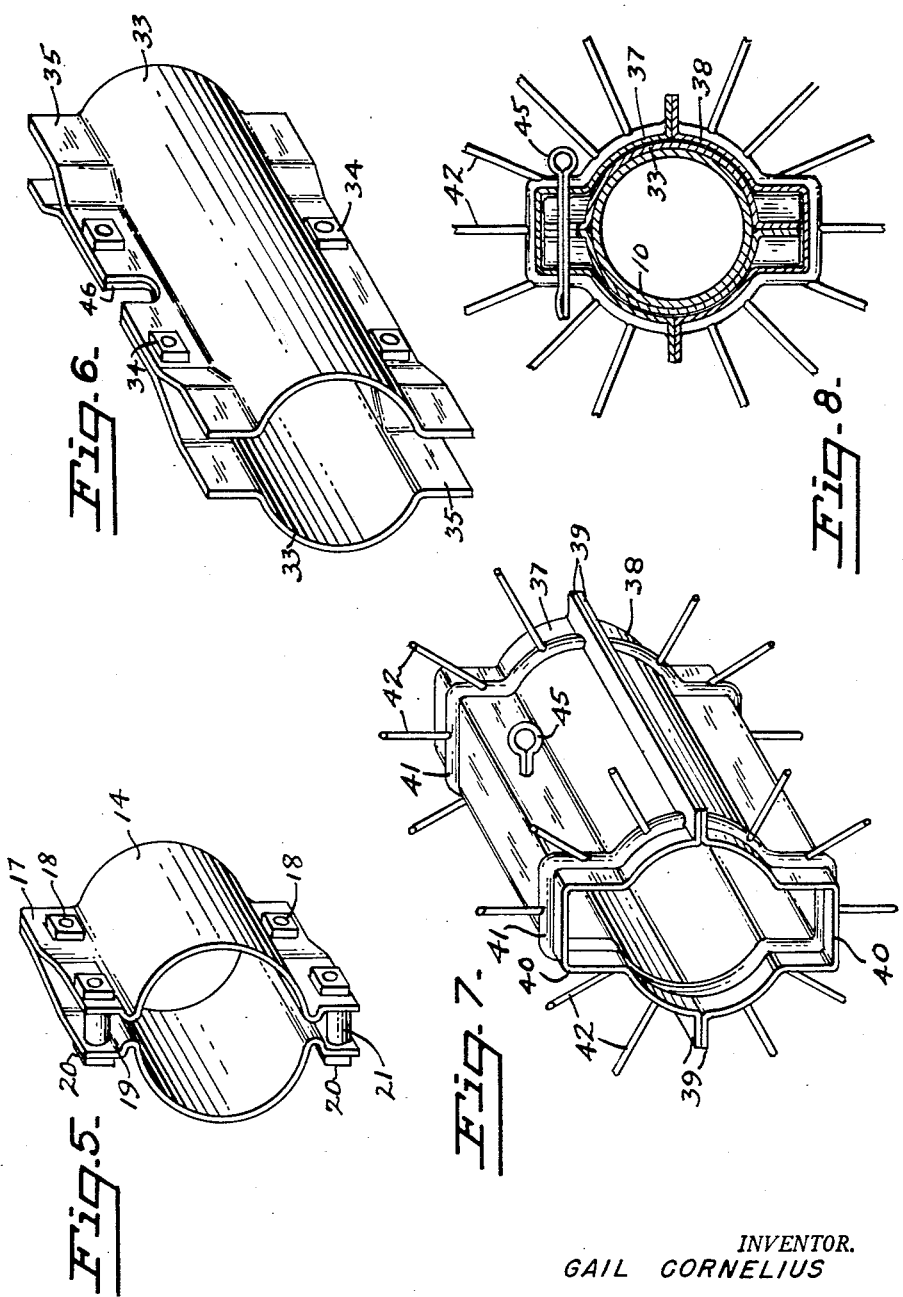

«««PATENT»»»

2,702,717
WHEEL SUPPORTED PIPE LINE

Gail Cornelius, Portland, Oreg., assignor to R. M. Wade & Co., Portland, Oreg., a corporation of Oregon Application September 5, 1950, Serial No. 183,184

2 Claims. (Cl. 287—52)

This invention relates to wheel supported pipe lines and is disclosed herein in its application to sprinkler type irrigation systems wherein a long pipe line carries and supplies water to spaced sprinklers and wherein the pipe line is supported on wheels to enable it to be advanced periodically over the surface of the field being irrigated.

It has been common practice to mount pipe lines on wheels with the wheels spaced throughout the length of the line and the pipe line serving as a common axle so that the wheels support it for advancing movement over the ground. Ordinarily the hub of the wheel serves as a coupling for adjacent lengths of pipe so that each length of pipe spans the distance between two wheels. This provides an advantage when the pipe line is disassembled for transportation because the wheels are readily separated from the pipe. However in practice and particularly in irrigation systems where light weight relatively flexible pipe is used, there are several disadvantages to this arrangement. In the first place, the lengths of pipe tends to sag greatly between the wheels which support them at their ends only and the sprinkler fittings and sometimes draining devices must be located intermediate the ends of the pipe lengths necessitating piercing of the pipe and otherwise weakening it.

It is an object of the present invention to provide an improved wheel supported pipe line wherein the wheels may be mounted at any desired point intermediate the ends of the pipe and wherein they are securely fixed against rotation relative to the pipe yet readily removable not only from their connection with the pipe, but also over coupling fixtures carried by the ends of the pipe. Further and more specific objects and advantages of the invention are made apparent in the following specification wherein the invention is described in detail by reference to the accompanying drawings.

In the drawings:

Fig. 1 is a perspective schematic view of a portion of a pipe line showing the relative positions thereon of wheels, couplings and sprinkler fittings;

Fig. 2 is a view in side elevation of a coupling showing the manner in which it connects together the ends of adjacent lengths of the pipe;

Fig. 3 is a bottom plan view of the fitting shown in Fig. 2;

Fig. 4 is a fragmentary view illustrating a modified form of the coupling shown in Fig. 3;

Fig. 5 is a perspective view of one of the coupling fixtures shown in Figs. 2 and 3 as carried by the pipe ends;

Fig. 6 is a perspective view of a wheel mounting adapted to be secured to a length of pipe intermediate its ends;

Fig. 7 is a perspective view of a wheel hub by means of which a wheel may be secured to the pipe through the mounting member shown in Fig. 6; and Fig. 8 is a central transverse vertical section through the wheel mounting and hub showing them in position on a pipe.

The general arrangement of a pipe line supported in the manner of the present invention is illustrated in Fig. 1 wherein the pipe is shown at 10 with coupling members 11 joining the ends of its separate lengths and wheels 12 mounted intermediate the ends of the lengths of pipe to support it for advancing movement over the surface of the ground. Sprinkler fittings 13 are shown as carried by the couplings 11. With an arrangement of this kind, units of sprinkler systems consisting of very long pipe lines are advanced either by hand or motive power to the successive positions which they must occupy to supply water to the entire surface of a large field.

The details of construction of the couplings 11 are best shown in Figs. 2 and 3 and coupling fixtures 14 secured to the ends of the pipe are shown in these figures and also in Fig. 5. Each coupling 11 comprises a hollow substantially cylindrical fitting into which the ends of two lengths of pipe 10 are inserted and sealed by gasket means contained by the coupling but not shown. The coupling 11 has a threaded outlet for the sprinkler, part of which is illustrated at 13, and an opposed threaded outlet 15 closed as by a plug 16. The outlet 15 may also serve for the reception of a special drain fitting which forms no part of the present invention.

In order to connect the coupling and the pipes to prevent endwise separation as well as to prevent relative rotation, the fixtures 14 are fitted to the ends of the pipe. Each of the fixtures 14, as best shown in Fig. 5, comprises a pair of substantially semi-cylindrical parts with flanges 17 at their edges adapted to be drawn together as by bolts 18 to provide a snug or clamped fit on the pipe. The flanges 17 project radially from the pipe and are bent or spread apart at one end to provide a space 19 where bolts 20, similar to but longer than the bolts 18, are fitted with spacers 21 and serve as latch pins for the coupling as will presently appear. Each of the couplings 11 is provided with at least one outwardly projecting lug 23 at each of its ends, as best shown in Fig. 3, to project into one of the spaces 19 provided by the coupling fixtures 14 and thus key the pipe and coupling against relative rotation. Each coupling also carries a latch member in the form of a long latch bar 24 with a hook-like portion 25 at each of its ends. The latch bar 24 is centrally perforated and slidably mounted on a pin 26 threaded into a boss 27 on the coupling. A spring 28 is interposed between the head of the pin 26 and the latch bar to urge the latch bar inwardly or toward the coupling while permitting it to be raised at either or both ends by hand. The hooked ends 25 of the latch bar engage the latch pins 21 on the coupling fixtures and serve to prevent endwise separation of the pipe and coupling member 11. Lugs 30 adjacent each end of the coupling prevent twisting of the latch bar about its central supporting pin 26 and the latch bar therefore also serves to prevent rotation of the pipe relative to the coupling. A modified form of latch bar is shown in Fig. 4 wherein the bar here shown at 24a has simplified hooked ends 25a and is not guided by lugs 30 on the coupling. However, in this case, the coupling, a part of which is shown at 11a, has a pair of lugs 23a projecting from each of its ends for reception by the spaces 19 of the coupling fixtures 14.

The coupling fixtures 14 are intended to remain on the pipe at all times and the wheels which are mounted intermediate the ends of the pipe are designed to permit their removal over the fixtures 14 and thus to permit ready removal and replacement of the wheels such for example as in the original shipment of the system or in the event of its disassembly for transporting purposes. The wheels are secured against rotation or endwise movement relative to pipe by means illustrated in Figs. 6, 7 and 8. Referring first to Fig. 6, a wheel mounting is shown as comprising a pair of semi-cylindrical flanged parts 33 adapted to be securely clamped to the pipe as by bolts 34. Portions 35 of the flanges are spread apart to provide bearing engagement with the wheel hub and are in effect keys to fit into key ways on the hub to prevent relative rotation of the wheel on the mounting. One reason for spreading the ends of the flanges in this manner is to protect all parts of the hub from engagement with opposite ends of the bolts 34 which engagement would be undesirable because of its small area of contact.

The hub of the wheel as shown in Fig. 7 is made of opposed halves 37 and 38 preferably joined as by flanges 39 welded or otherwise suitably secured together. The halves 37 and 38 of the wheel hub are substantially cylindrical except for radially projecting rectangular key ways 40 formed one in each of the halves and occupying opposed positions as do the key-like portions 35 on the wheel mounting. The hub may be formed of pressed metal parts and is preferably provided with pressed reenforcing ribs 41 adjacent its ends. Spokes partially shown at 42 radiate from these ribs and are secured at their outer ends to the rims of the wheels in any conventional manner. By virtue of the construction illustrated, the hub passes readily into its normal position over the wheel mounting shown in Fig. 6 and its key ways 40 are of sufficient dimensions to permit it also to slide over the coupling fixtures 14 so that the wheel may be removed from the pipe without removing these fixtures.

Fig. 8 shows the relative positions of the pipe 10, the wheel mounting 33 and the hub 37—38 when assembled and also shows a key 45 slidably through suitable openings in one of the key ways 40 of the hub and passing through a notch 46 formed in one pair of flanges of the wheel mounting as shown in Fig. 6. This key serves to prevent endwise movement of the wheel relative to the wheel mounting and pipe.

With the invention herein described, the wheels support the lengths of the pipe from positions intermediate their ends, thus tending to eliminate part of the sag which takes place between the wheels particularly when the pipe is filled with water. Furthermore, the intermediately positioned coupling members serve as additional stiffening means to prevent sag and serve to provide a mounting for sprinklers and drain means where necessary without requiring additional fittings and undesirable perforation of the body of the pipe itself.

I claim:

1. A wheel mounting for pipe lines or the like which comprises a pair of semi-cylindrical parts with outwardly flanged edges, bolts extending through said edges to clamp the parts together and against rotation about a pipe presenting two oppositely disposed flange assemblies projecting radially of the pipe, a wheel hub with an opening of sufficient size to slide over said parts and having key ways receiving said flange assemblies, one of said flange assemblies having a notch formed therein, and a pin fitting transversely through one key way and said notch to retain the hub on the mounting.

2. A wheel mounting for pipe lines or the like which comprises a pair of semi-cylindrical parts with outwardly flanged edges and bolts passing through said flanged edges to clamp the parts against rotation about a pipe presenting two oppositely disposed flange assemblies projecting radially of the pipe, said flanged edges being spread adjacent their ends to provide an effective thickness greater than the length of said bolts, a wheel hub having an opening of sufficient size to slide over said flange assemblies and having key ways embracing the spread portions of said flanged edges, and means to prevent endwise movement of the hub relative to said parts.

References Cited in the file of this patent

UNITED STATES PATENTS

| Number | Name | Date |
|---|---|---|
| 473,524 | Reeves | Apr. 26, 1892 |
| 502,620 | Fisher | Aug. 1, 1893 |
| 656,944 | Clark | Aug. 28, 1900 |
| 764,330 | Anderson | July 5, 1904 |
| 1,601,199 | Clapper | Sept. 28, 1926 |
| 1,627,193 | Nelson | May 3, 1927 |
| 1,748,630 | Booth | Feb. 25, 1930 |
| 2,516,711 | Mansur | July 25, 1950 |